United States Patent [19]

Yoshikawa et al.

[11] Patent Number: 4,825,312
[45] Date of Patent: Apr. 25, 1989

[54] CASSETTE LOADING MECHANISM

[75] Inventors: Kikuo Yoshikawa; Takao Kanai; Katsumi Yamaguchi; Syouichiro Yokoi, all of Tokyo, Japan

[73] Assignee: Clarion Co., Ltd., Tokyo, Japan

[21] Appl. No.: 30,202

[22] Filed: Mar. 24, 1987

[30] Foreign Application Priority Data

Mar. 31, 1986 [JP] Japan .................. 61-74558

[51] Int. Cl.[4] ............................. G11B 15/00
[52] U.S. Cl. ................................. 360/96.5
[58] Field of Search ............................ 360/96.54, 96.6

[56] References Cited

U.S. PATENT DOCUMENTS 4,424,540 1/1984 Naoi .................. 360/96.5
4,586,096 4/1986 Okada .
4,628,381 12/1986 Takai .

Primary Examiner—A. J. Heinz
Attorney, Agent, or Firm—Flynn, Thiel, Boutell & Tanis

[57] ABSTRACT

An R-DAT cassette loading mechanism comprises a reversible motor; a rotary member drivingly connected to the motor and having a driving pin formed at a central position of its lateral surface; a loading plate having first and second cam portions and pulled by the driving pin to reciprocally slide on a straight line; a guide link pivotably supported on a fixed member and rotated vertically by the first cam portion; a cassette holder pivotably supported on a free end portion of the guide link; a cassette guide having a contact portion accepting a front end portion of a cassette and slidably movable between a cassette sucking position and a cassette ejecting position; and a loading link pivotably supported on a fixed member and rotated on a horizontal plane by the second cam portion to slidably move the cassette guide.

6 Claims, 9 Drawing Sheets

FIG. 3
FIG. 4
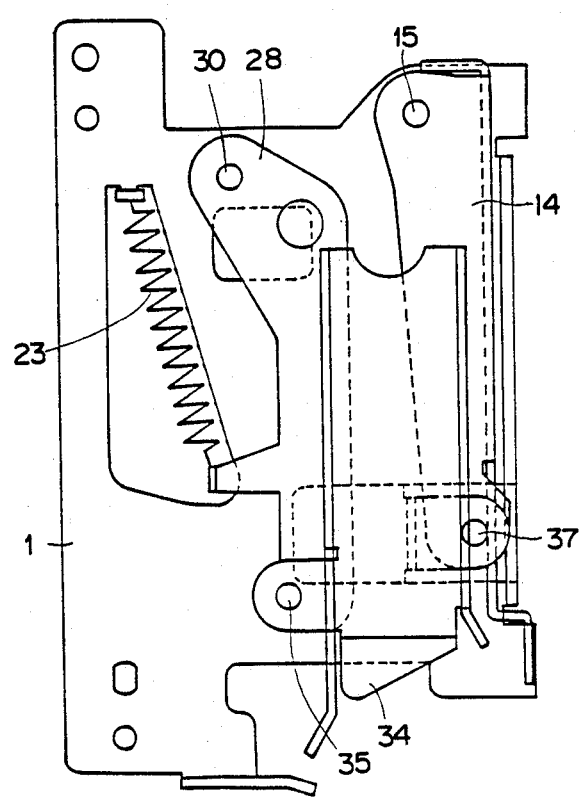
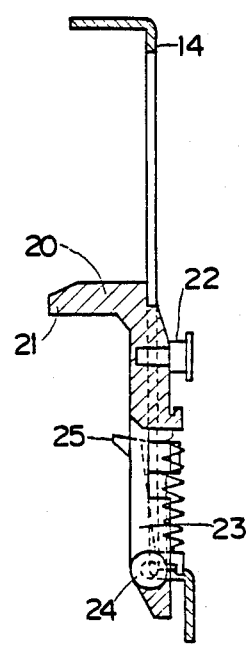

FIG. 7
FIG. 8
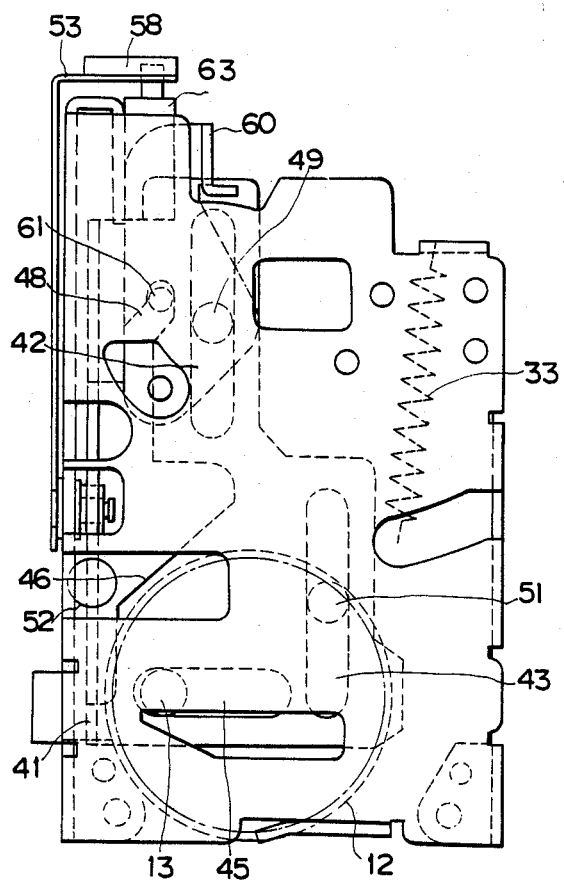
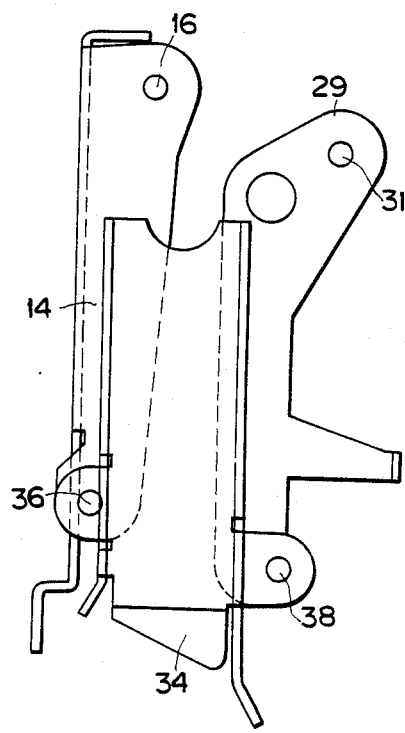

FIG. 9
FIG. 10
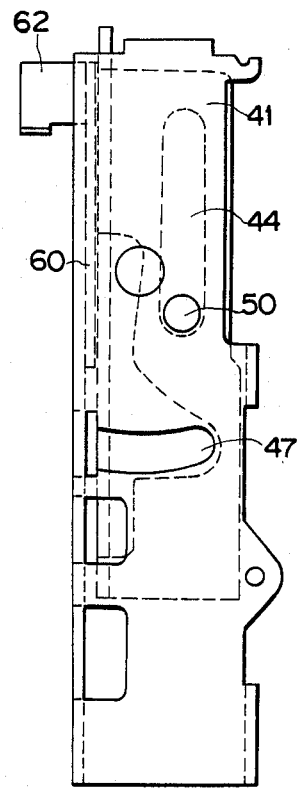
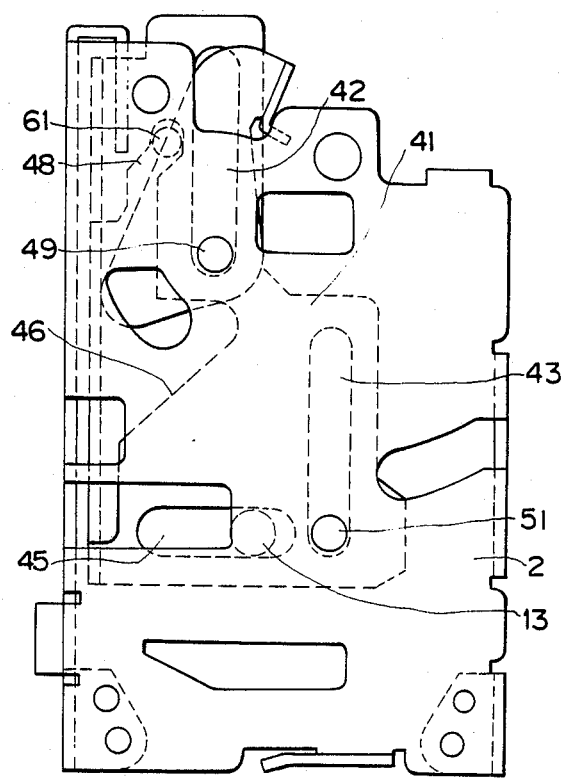

4,825,312

CASSETTE LOADING MECHANISM

FIELD OF THE INVENTION

This invention relates to a cassette loading mechanism suitable for a cassette tape player, and more particularly to a cassette loading mechanism of a front loading type in a digital audio tape player having a rotary cylinder head (hereinafter called "R-DAT").

BACKGROUND OF THE INVENTION

There are prior art cassette type magnetic tapes used for recording and reproduction of audio and video signals, such as compact cassettes made by Philips or home video cassettes of VHS or β system. As to front loading systems for these tape cassettes, various loading mechanisms are proposed.

Recently, standards of R-DAT cassettes are uniformed. However, as having been experienced in the past, particular loading mechanisms are required also for cassettes of the R-DAT standard type because there are various configurations related to lid sliders and loading grips. This makes it difficult to use any conventional loading mechanism in its original form.

OBJECT OF THE INVENTION

It is therefore an object of the invention to provide a cassette loading mechanism of a front loading type for R-DAT standard type cassettes, which loading mechanism is configured to move a cassette in its sucking direction by a motor power to place it at a predetermined setting or loading position and effect a reliable motion for moving it in its removal direction.

SUMMARY OF THE INVENTION

The invention arrangement includes a reversely rotatable motor to which a rotary member is drivingly connected. The rotary member has a driving pin at an eccentric position on its side surface.

A loading plate is reciprocally, slidably connected to the driving pin, and has first and second cam portions.

On a fixing member is pivotably supported a guide link which is pivotably moved vertically by the first cam portion.

On a free end of the guide link is pivotably supported a cassette holder.

The invention arrangement also includes a cassette guide which has a contact portion for catching the front end portion of a cassette and slidably moves the cassette between its sucking and discharging positions.

The fixing member also carries a loading link pivotably supported thereon. The loading link is pivotably moved on a horizontal plane by the second cam portion to slidably move the cassette guide.

According to the invention arrangement, when a cassette is manually inserted in the cassette holder, the front end portion of the cassette abuts the contact portion of the cassette guide.

After the cassette is inserted in the cassette holder, and when the front end of the cassette contacts and urges the cassette guide, the motor is driven in its forward direction. With this forward rotation of the motor, the rotary member is rotated, and the driving pin on the rotary member slidably moves the loading plate in one direction (going direction).

With this going slidably movement of the loading plate, the second cam portion rotates the loading link in its going direction. With this going rotation of the loading link, the cassette guide is pulled and slidably moves in its going direction, transporting the cassette to its predetermined position in its sucking direction. Further, with the going sliding movement of the loading plate, the first cam portion rotates the guide link in its going direction. With this going rotation of the guide link, the cassette holder drops to its cassette setting or loading position to place and fix the cassette at the predetermined setting position. Meanwhile, a lid of the cassette, is opened by a lid opening means.

For cassette ejection, the motor is rotated in its reverse direction.

With this reverse rotation of the motor, the rotary member, loading plate, guide link and loading link are linked together for their returning motions, so that after the cassette guide is elevated from its setting position, it slidably moves in its cassette ejecting direction and enables removal of the cassette at a predetermined discharging position.

BRIEF DESCRIPTION OF THE DRAWINGS

FIGS. 1 through 11 are views showing an embodiment of the invention, i which FIG. 1 is a plan view, FIG. 2 is a front elevation, FIG. 3 is a longitudinally crossing side elevation taken along III—III line of FIG. 1, FIG. 4 is a central, longitudinally crossing side elevation of FIG. 1, FIG. 5 is a transvesely crossing plan view of a portion including a gear train, FIGS. 6, 7 and 8 are longitudinally crossing side elevations taken along VI—VI line, VII—VII line and VIII—VIII line of FIG. 1, respectively, FIG. 9 is a transversely crossing plan view of a portion including a right side plate, loading plate and lid link, FIG. 10 is a side elevation showing operative relationships among a loading gear used as a rotary member, loading plate and lid link during cassette ejection, FIG. 11 is a view showing a configuration in which a cassette is at a setting position and FIGS. 12 and 13 respectively showing a perspective view and an exploded view of the inventor.

DETAILED DESCRIPTION

Figure 1:
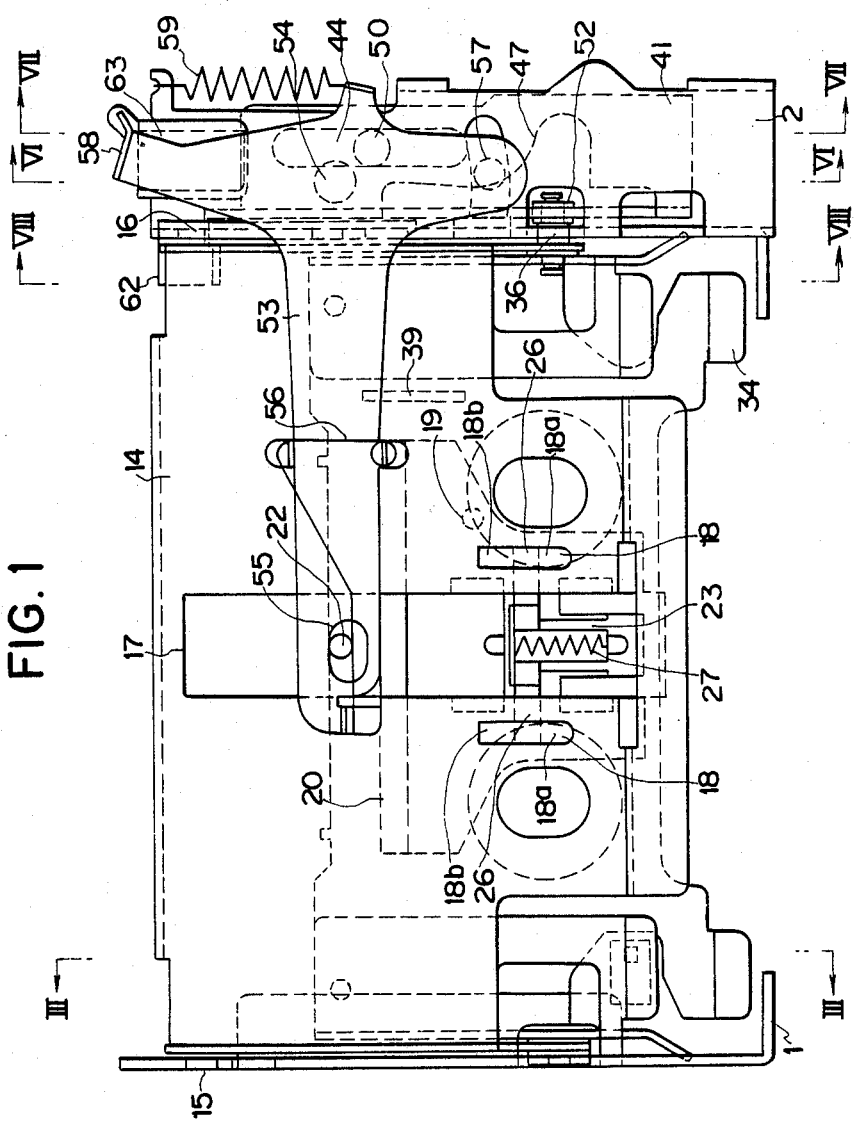
Figure 2:
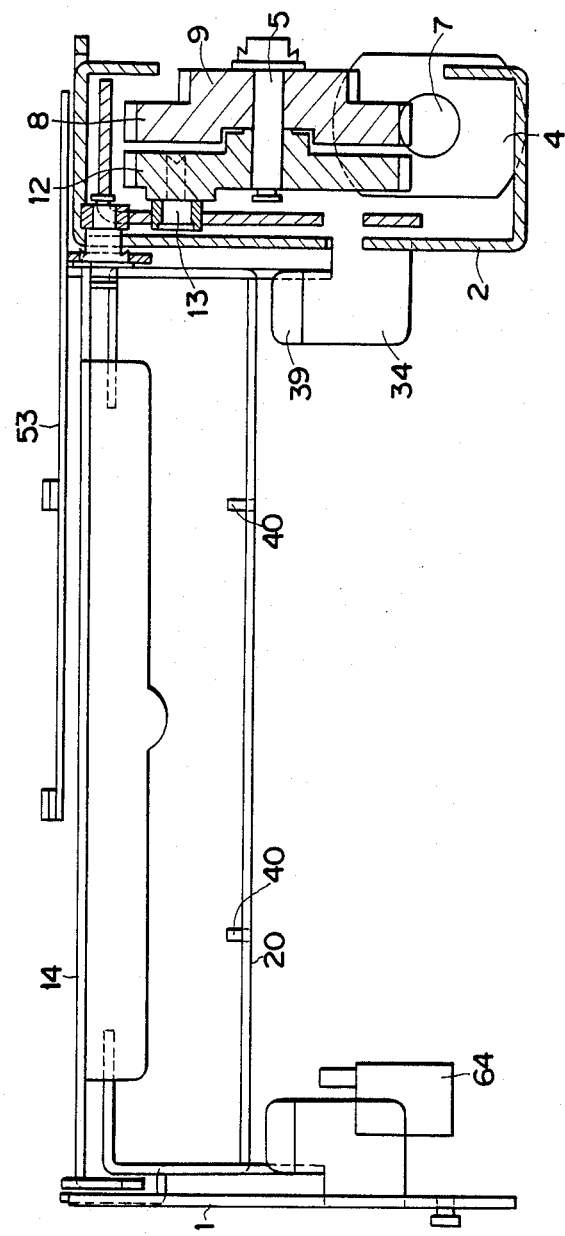
Figure 5:
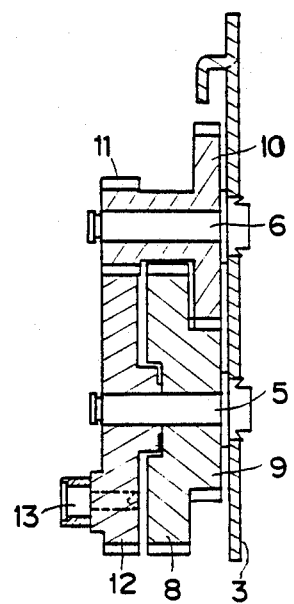
Figure 6:
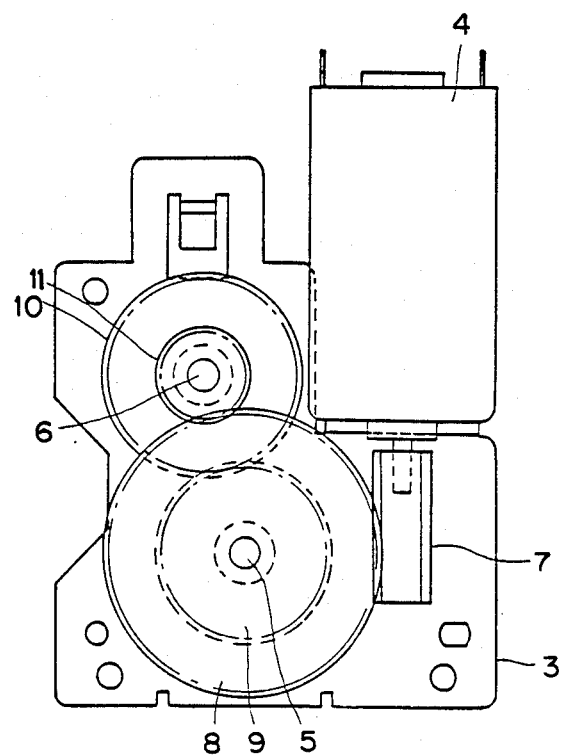
Figure 11:
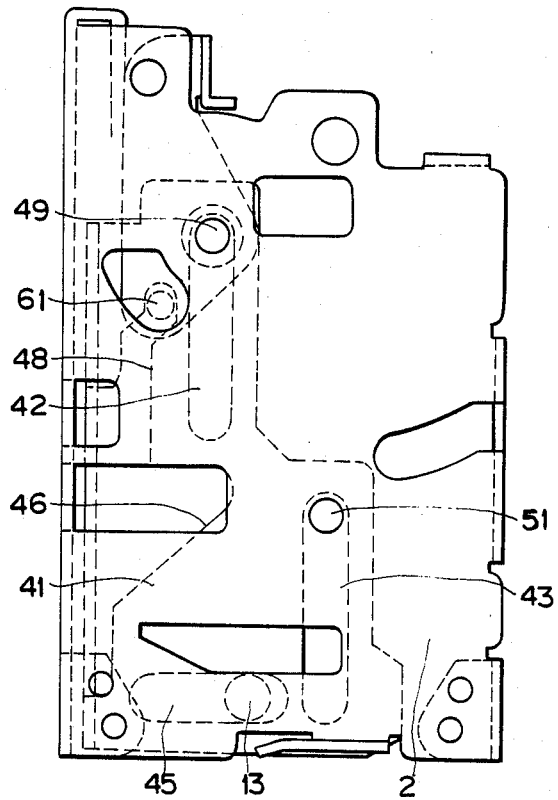
Figure 12:
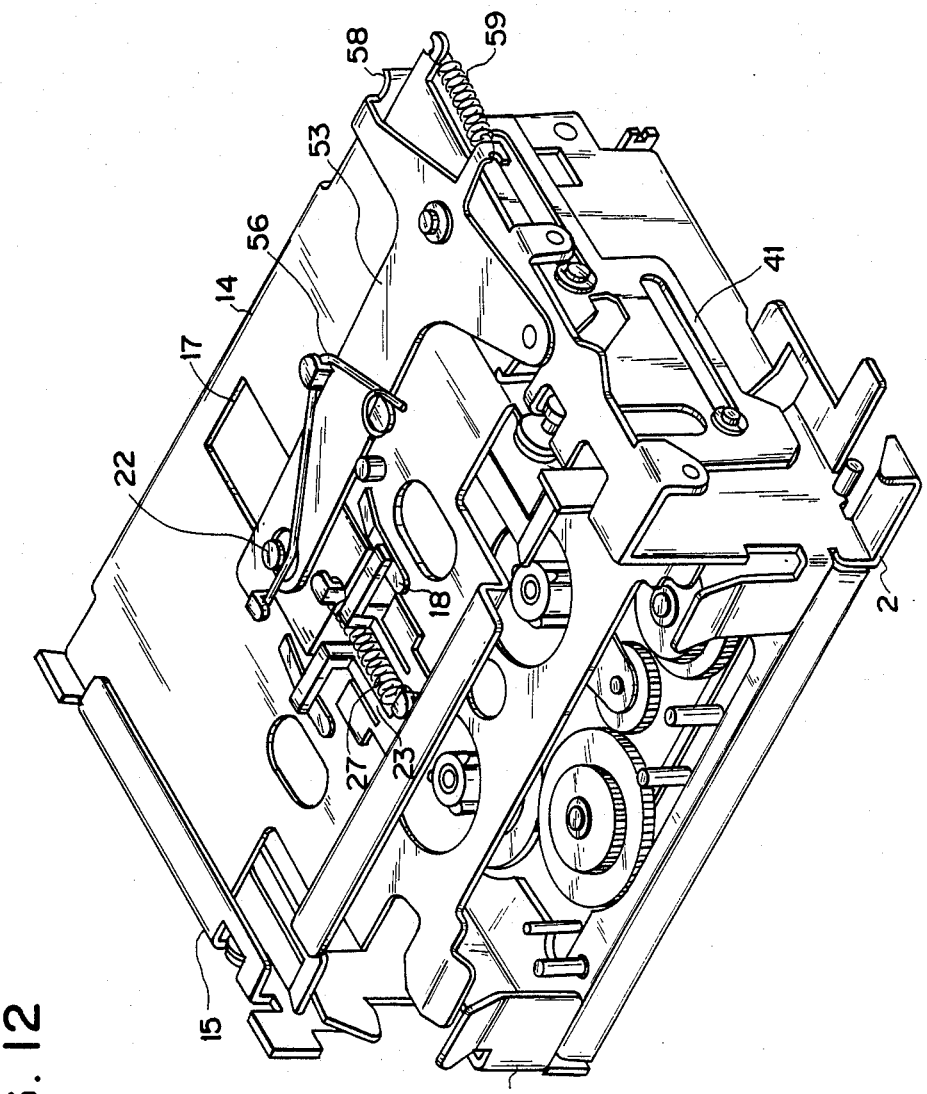
Figure 13:
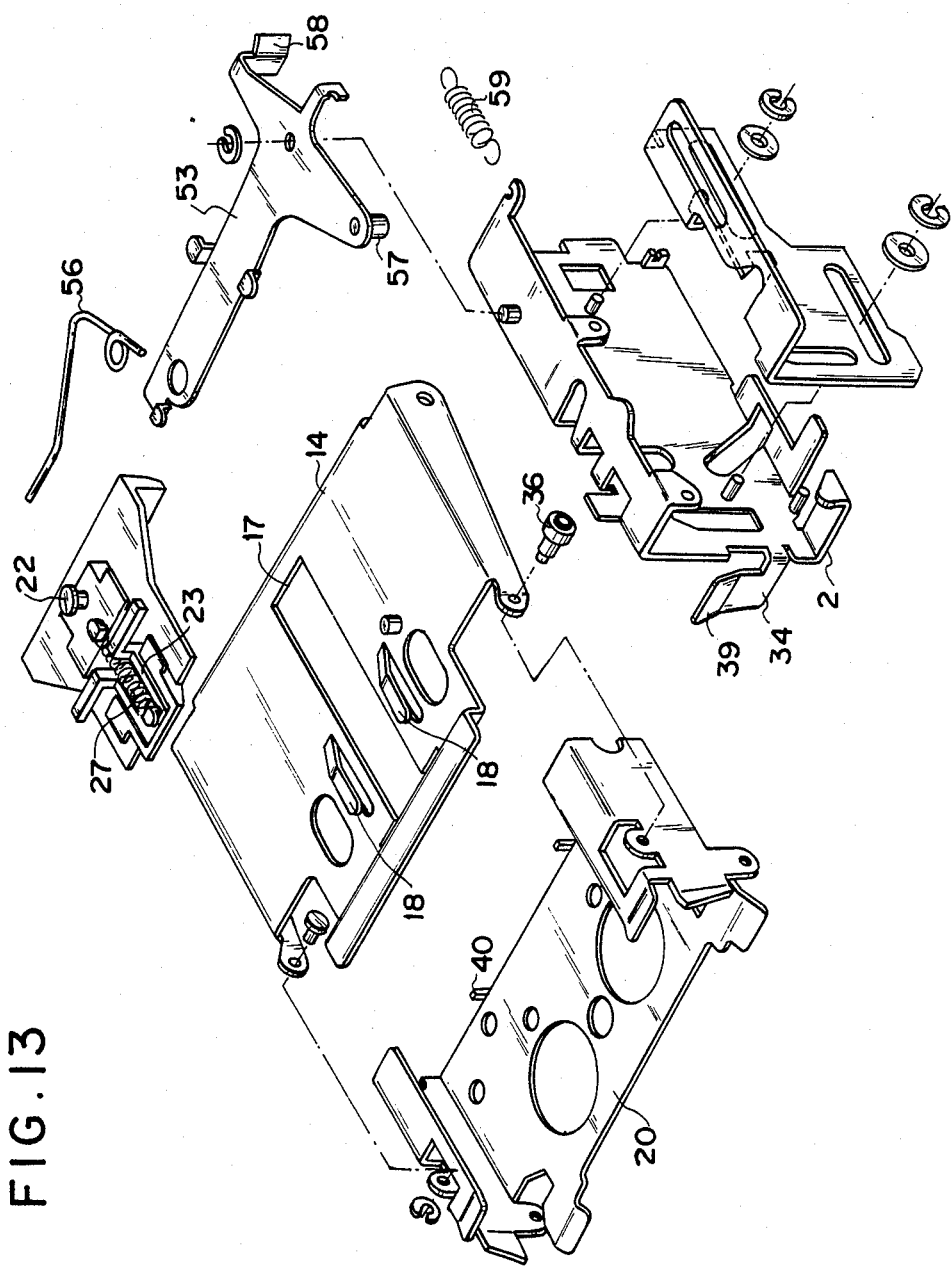

The invention is described below, referring to an embodiment illustrated in the drawings FIGS. 1 through 11 are views showing an embodiment of the invention, in which FIG. 1 is a plan view, FIG. 2 is a front elevation, FIG. 3 is a longitudinally crossing side elevation taken along III—III line of FIG. 1, FIG. 4 is a central, longitudinally crossing, side elevation of FIG. 1, FIG. 5 is a transversely crossing plan view of a portion including a gear train, FIGS. 6, 7 and 8 are longitudinally crossing side elevations taken along VI—VI line, VII—VII line and VIII—VIII line of FIG. 1, FIG. 9 is a transversely crossing plan view of a portion including a right side plate, loading plate and lid link, FIG. 10 is a side elevation showing operative relationships between a loading gear used as a rotary member, loading plate and lid link during cassette ejection, and FIG. 11 is a view showing a configuration in which a cassette is at a setting position.

The illustrated cassette loading mechanism includes side plates 1 and 2. Both side plates 1 and 2 are disposed on a main chassis (not shown) in an opposed fashion at a distance and secured there.

One side plate 1 includes, as shown in FIG. 3, a pin 15 supporting a guide arm 14, a pin 30 supporting one of guide links shown at 28 and a hook portion for a pulling spring 32. The side plate 1, as shown in FIG. 2, also includes a mount portion of a second switch 64.

On the other side plate 2 is secured a loading gear plate 3 as shown in FIG. 5. The side plate 2, as shown in FIG. 8, includes a pin 16 supporting the guide arm 14 and a pin 31 supporting the other guide link shown at 29. The side plate 2 further includes, as shown in FIG. 7, a guide pin 49 not only guiding movements of a loading plate 41 but also pivotally supporting a lid link 60, guide pin 51 for the loading plate 41 and a pin 54 (FIG. 1) supporting a loading link 53. The side plate 2 also includes, as shown in FIGS. 1 and 7, a mount portion for a first switch 63 and hook portions for pulling springs 33 and 59.

As shown in FIG. 6, a motor 4 and rotation axles 5 and 6 for loading gears are mounted on the loading gear plate 3.

The motor 4 is rotatable in opposite directions, and has an output axle on which a worm 7 is mounted.

On one of the rotation axles shown at 5 are supported a worm wheel 8 engaging the worm 7, a loading gear 9 formed in a unitary body with the worm wheel 8 and a loading gear 12 used as a rotary member. The loading gear 12 has a driving pin 13 at an eccentric position on its lateral surface. On the other rotation axle 6 are supported large and small loading gears 10 and 11 which are formed in a unitary body as shown in FIG. 5. Energy of the motor 4 is transmitted in a speed reducing fashion in the order of worm 7→worm wheel 8→loading gears 9, 10, 11 and 12.

Between the side plates 1 and 2 is disposed the guide arm 14 as shown in FIGS. 1 to 3 and 8.

The guide arm 14 is supported pivotably by the side plates 1 and 2 via pins 15 and 16. The guide arm 14 includes a guide slot 17 of a cassette guide 20, step portions 18—18 controlling a grip arm 23 and a stopper 19. The guide slot 17, as shown in FIG. 1, extends from an insertion aperture of a cassette (not shown) in a cassette sucking direction across a central portion of the guide arm 14. The step portions 18—18 are provided at both sides of one end of the guide slot 17 nearer to the cassette insertion aperture in a parallel relationship. Each step portion 18, has a ⌐-shaped cross section including a flat portion 18a higher the upper surface of the guide arm 14 and an angled portion 18b descending from the flat portion 18a toward the cassette sucking direction.

The guide arm 14, as shown in FIGS. 1 and 4, embraces a cassette guide 20 mounted thereon.

The cassette guide 20 is slidable on a plane along the guide slot 17 formed on the guide arm 14 in cassette sucking and discharging directions. The cassette guide 20 includes, as shown in FIG. 4, a contact portion 21 for contact with a cassette, a support portion supporting a grip arm 23, and an engage pin 22 for engagement with a loading link 53. The cassette contact portion 21 projects downwardly from a front end portion of the cassette guide 20.

To the cassette guide 20 is mounted a grip arm 23 as shown in FIGS. 1 and 4.

The grip arm 23 is mounted on the support portion of the cassette guide 20 via a pin 24 pivotably up and down. The grip arm 23 also includes a cassette holding claw 25 and engage members 26—26 for engagement with the step portions 18—18 of the guide arm 14. The cassette holding claw 25, as shown in FIG. 4, projects downwardly for selectively entering in a loading grip of a cassette. The engage members 26—26 closely contact the step portions 18—18. The grip arm 23 is biased by a pulling spring 27 in a direction for entering the cassette holding claw 25 in the loading grip of a cassette.

Inside the side plates 1 and 2 are disposed the guide links 28 and 29 as shown in FIGS. 3 and 8. One of the guide links shown at 28, as shown in FIG. 3, is pivotably supported by the pin 30 on the side plate 1 and biased by a pulling spring 32 toward its cassette loading direction. The guide link 28 cooperates with the guide arm 14 to form a four-node link.

Between the guide links 28 and 29 is disposed a cassette holder 34 as shown in FIGS. 1 to 3 and 8.

The cassette holder 34 has a ⌐-shaped front face as shown in FIG. 2. The cassette holder 34 is united at its both side portions to a free end of the guide arm 14 by pins 35 and 36 and united at its both lower side portions to free ends of the guide links 28 and 29 by pins 37 and 38. The cassette holder 34 further includes, as shown in FIG. 2, an unlocking portion 39 for unlocking a slider of a cassette (not shown) and a slider holding claw 40. One of the pins shown at 36 uniting the cassette holder 34 to the guide arm 14, as shown in FIG. 7, includes a cam follower 52 engaging a first cam portion 46 which will be described later.

Outside the side plate 2 is disposed a loading plate 41.

The loading plate 41, as shown in FIGS. 1, 2 and 7, has a ⌐-shaped front face including a vertically extending portion a horizontally extending portion. The vertically extending portion of the loading plate 41, as shown in FIG. 7, is provided with elongated guide holes 42 and 43, elongated driving hole 45 and first and third cam portions 46 and 48. The horizontally extending portion, as shown in FIG. 1, is provided with an elongated guide hole 44 and a second cam portion 47. The loading plate 41 is supported for reciprocal slidable movement on a straight line parallel to the cassette sucking or ejecting direction by engagement of the guide pin, i.e. lid link pin 49 on the side plate 2 with the elongated guide hole 42 and by engagement of the guide pins 50 and 51 with the elongated guide holes 43 and 44. The loading plate 41, as shown in FIGS. 2 and 7, is configured to slidably reciprocate on the aforegoing straight line via engagement of the driving pin 13 on the loading gear 12 used as a rotary member with the elongated driving hole 45 formed in the loading plate 41.

The first cam portion 46, as shown in FIG. 7, includes an angled portion and a straight portion continuous from the angled portion. As shown in FIGS. 1 and 7, the cam follower 52 formed on the pin 36 uniting the cassette holder 34 to the guide arm 14 engages the first cam portion 46 so that the engagement of these members causes the guide together with the cassette holder 34 so as place and fix a cassette at its loading position The second cam portion 47, as shown in FIG. 1, includes an angled portion and a straight portion continuous from the angled portion. The second cam portion 47 is configured to engage a cam follower 57 of a loading link 53.

The third cam portion 48 has a horizontally extending portion and an angled portion continuous therefrom. The third cam portion 48 is configured to engage a cam follower 61 of a lid link 60.

The loading link 53, as shown in FIGS. 1 and 7, has a configuration in the form of reversed letter T as seen in a plan view, and is supported pivotably by a pin 54 on the side plate 2. The loading link 53 includes an engage hole 55, spring 56, cam follower 57 and switch urging portion 58. The engage hole 55, as shown in FIG. 1, is formed as an elongated hole at one free end and engages an engage pin 22 formed on the cassette guide 20. The spring 56 is configured to maintain a predetermined positional relationship between the loading link 53 and the cassette guide 20 whose engage pin 22 engages the engage hole 55. The cam follower 57, as shown in FIGS. 1 and 7, is formed at the other free end portion of the loading link 53 and engages the second cam portion 47 of the loading plate 41. The switch urging portion 58, as shown in FIGS. 1 and 7, is provided at another free end portion of the loading link 53 to push the first switch 63. The loading link 53 is pivotably moved by the second cam portion 47 and the cam follower 57 on a horizontal plane in a direction for sucking a cassette, and biased by a pulling spring 59 in a rotating direction for cassette ejection.

The lid link 60, as shown in FIGS. 1 and 7, is pivotably supported on the side plate 2 by the pin 49 for guidance of the loading plate 41 and for supporting the lid link. The lid link 60 includes a cam follower 61 and a lid urging portion 62 for urging a lid of a cassette. The cam follower 61, as shown in FIG. 7, engages the third cam portion 48 formed on the loading plate 41. The cassette lid urging portion 62 is configured to urge and open a lid (not shown) of a cassette when the lid link 60 is rotated in its going direction.

The illustrated arrangement includes first and second switches 63 and 64.

The first switch 63 is fixed to a switch mount portion of the side plate 2 as shown in FIG. 7. The first switch 63 is configured to take its on-position to activate the motor 4 when the loading link 53 is rotated in its going direction.

The second switch 64 is fixed to a switch mount portion of the side plate 1 as shown in FIG. 2. The second switch 64 is configured to take its on-position to deenergize the motor 4 when a cassette is dropped to and placed at a predetermined setting position together with the cassette holder 34.

With this arrangement, the cassette loading mechanism operates as follows.

[Loading Motion]

As a cassette is manually pushed into the cassette holder 34 through the cassette insertion aperture, with the opening end, i.e. lid-side end of the cassette being opposed frontward, the front end of the cassette abuts the urging portion 21 of the cassette guide 20.

As the cassette is further manually pushed against the energy of the pulling spring 59 of the loading link 53, the engage portions 26—26 of the grip arm 23 first disengage from the step portions 18—18 of the guide arm 14, so that the grip arm 23 is rotated counterclockwise in FIG. 4 by the energy of the pulling spring 27, and the cassette holding claw 25 drops in the loading grip of the cassette. As a result, the cassette is supported in its back and forth directions by the urging portion 21 of the cassette guide 20 and the cassette holding claw 25 of the grip arm 23.

When the cassette is further inserted, the loading link 53 linked to the cassette guide 20 by engagement between the engage pin 22 and engage hole 55 is rotated about the pin 54 in its going direction, i.e. in the clockwise direction in FIG. 1, and the switch pushing portion 58 of the loading link 53 pushes the first switch 63 to turn it on.

Simultaneously with the on-motion of the first switch 6, the motor 4 is driven in its forward direction, and cassette loading operation is commenced.

At the start of cassette loading operation, the loading plate 41 is placed at a position for cassette removal, i.e. innermost position opposite to the cassette insertion aperture. With a forward rotation of the motor 4 from this situation, the power is transmitted in a speed reducing fashion to the worm 7, worm wheel 8 and loading gears 9, 10, 11 and 12 in this order, so that the driving pin 13 on the loading gear 12 moves in the counterclockwise direction in FIG. 7.

With the counterclockwise direction of the driving pin 13, the loading plate 41 linked to the driving pin 13 via engagement of the elongated driving slot 45 of the loading plate 41 is slidably moved from the cassette ejecting position of FIG. 10 to the cassette loading position of FIG. 11.

With the movement of the loading plate 41 from the cassette ejecting position to the cassette loading position, and under engagement between the second cam portion 47 of the loading plate 41 and the cam follower 57 of the loading link 53, the loading link 53 is further rotated by the motor 4 clockwisely in FIG. 1 from the position for operating the first switch 63. As the loading link 53 rotates clockwisely with the power of the motor 4, the cassette is moved together with the cassette guide 20 in the cassette sucking direction.

After this, the loading link 53 is held at the cassette sucking position by the second cam portion 47, whereas the cam follower 52 heretofore held by the first cam portion 46 of the loading plate 41 slides down the angled portion of the first cam portion 46 with the energy of the pulling springs 32 and 33 of the guide links 28 and 29. As a result, the guide arm 14 is rotated about the pins 15 and 16 in the clockwise direction in FIG. 3.

With the clockwise rotation of the guide arm 14, the cassette drops to and is set at the predetermined setting position together with the cassette holder 34 pivotably supported on the guide arm 14. At that time, the second switch 64 is pushed to its on-position directly by the cassette, or by the switch pushing portion of the cassette holder 34, so that the motor 4 stops, and the driving pin 13 is on standby at the cassette setting position of FIG. 11.

On the other hand, the slider of the cassette is opened by manual insertion or in horizontal movement effected by cassette sucking motion by the power of the motor 4. While the cassette moves from the cassette ejecting position to the cassette sucking position, the slider unlock portion 39 of the cassette holder 34 first unlocks the slider in the cassette. Although the cassette major body continues its movement, the slider is held by the slider holding claw 40 of the cassette holder 34 approximately from the unlocked position, whereas the cassette major body moves to the sucking position. As a result, the slider is fully opened when the cassette reaches the sucking position. Further, the slider is locked again by a mechanism in the cassette upon completion of the cassette suction.

On the other hand, the lid of the cassette is opened simultaneously with a dropping motion of the cassette following the sucking motion. In the illustrated embodiment, the up and down movement stroke of the cassette is smaller than the stroke of the opening and closing movement of the lid. In this connection, the lid link 60 having the lid pushing portion 62 is rotated to compensate the shortage of the stroke. More specifically, after the cassette is sucked and while the loading plate 41 moves from the position of FIG. 10 to the position of FIG. 11, the third cam position 48 of the loading plate 41 activates the cam follower 61 of the lid link 60 to rotate the lid link 60 about the pin 49 in the counterclockwise direction in FIG. 7, so that the lid pushing portion 62 pushes and opens the lid. In this way, the shortage of the stroke is covered.

[Ejecting Motion]

The motor 4 is configured to rotate in its reverse direction when an ejection button is pushed, for example.

With a reverse rotation of the motor 4, the driving pin 13 moves clockwisely in FIG. 11 and slidably moves the loading plate 41 from the cassette setting position of FIG. 11 to the cassette ejecting position of FIG. 10.

As the loading plate 41 moves from the cassette setting portion to the cassette ejecting position, the cam follower 52 is first elevated by the angled portion of the first cam portion 46, so that the guide arm 14 rotates about the pins 15 and 16 in the counterclockwise direction in FIG. 3, and the cassette as well as the cassette holder 34 is elevated to the same height as that on cassette insertion.

While the loading plate 41 continues its movement in the aforegoing direction, the guide arm 14 is held at the height on cassette insertion. The loading link 53 rotates about the pin 54 counterclockwisely in FIG. 1 due to the energy of the pulling spring 59 of the loading link 53 and under cooperation between the second cam portion 47 and the cam follower 57 of the loading link 53.

With the counterclockwise rotation of the loading link 53, the engage hole 55 formed therein cooperates with the engage pin 22 of the cassette guide 20 to move the cassette guide 20 toward the cassette sucking position. With the movement of the cassette guide 20 in the cassette ejecting direction, the cassette is pushed toward the cassette insertion aperture by the cassette pushing portion 21 of the cassette guide 20.

In this embodiment, the first switch 63 is commonly used to instruct completion of an ejecting operation, and is configured to take its off-position when the switch pushing portion 58 of the loading link 53 moves away from the first switch 63 during an ejecting movement of the cassette. After the first switch 63 takes its off-position, an instruction for completing the ejecting motion is produced a predetermined time interval later as determined by a delay circuit, etc. so that the motor 4 is continuously rotated until the driving pin 13 reaches the position where cassette ejection is completed.

Just when the loading plate 41 reaches the cassette ejecting position, the step portions 18—18 of the guide arm 14 act on the engage portions 26—26 of the grip arm 23 to rotate the grip arm 23 about the pin 24 in the clockwise direction in FIG. 4, so that the cassette holding claw 25 of the grip arm 23 disengages from the loading grip of the cassette.

On the other hand, due to cooperation between the third cam portion 48 of the loading plate 41 and the cam follower 61 of the lid link 60, the lid link 60 rotates about the pin 49 in the clockwise direction in FIG. 7, and the lid is moved to its closed position by a shutting operation mechanism provided inside the cassette.

Following to the movement of the cassette in its ejecting direction, the slider is unlocked and remains at a position where it contacts the slider holding claw 40 before it takes its fully closed position with respect to the still moving cassette major body with its own resiliency, whereas the slider moves together with the cassette major body from the fully closed position to the cassette ejecting position.

When the cassette reaches the ejecting position, a user can manually remove it.

In the present invention, one of the guide links 28 and 29 may be omitted.

When the lid opening and closing stroke coincide with the up and down movement stroke of the cassette, the lid link 60 may be omitted so that the lid is opened or closed by a fixed lid pushing member.

Detailed structures in various portions of the invention mechanism are not limited to those in the illustrated embodiment, but may be others which can attain the intended functions.

According to the invention heretofore described, the mechanism includes the reversible motor; a rotary member drivingly linked to the motor and having a driving pin formed at an eccentric position on its lateral surface; a loading plate having first and second cam portions and pulled by the driving pin to reciprocally slidably move on a straight line; a guide link vertically rotated by said first cam portion; a cassette holder pivotably supported on a free end of the guide link; and a cassette guide having a contact portion accepting a front end portion of a cassette and slidable between a cassette sucking position and a cassette ejecting position; and a loading link pivotably supported on a fixed member and rotated by the second cam portion on a horizontal plane to slidably move the cassette guide. Therefore, in a front loading system for R-DAT standard type cassettes, the invention gives effects that a cassette is moved by motor power in the sucking direction and properly set at a predetermined loading position and that motions for moving a cassette in its ejecting direction are effected reliably.

What is claimed is:

1. A cassette loading mechanism in a cassette tape player comprising:
   a reversible motor;
   a rotary member driven by said motor and having a driving pin at an eccentric position on a surface thereof;
   a loading plate supported for reciprocal movement, having first and second cam portions and having means cooperable with said driving pin for reciprocally moving said loading plate between first and second positions substantially parallel to a straight line in response to rotational movement of said rotary member;
   a guide arm pivotably supported on a stationary member and cooperable with said first cam portion, said guide arm being pivoted by said first cam portion between first and second positions in response to movement of said loading plate between its first and second positions, respectively;
   a cassette holder supported on a free end of said guide arm;
   a cassette guide having a contact portion engageable with a front end portion of a cassette and movable relative to said cassette holder between a cassette inserted position and a cassette ejecting position; and
   a loading link pivotably supported on a stationary member, operatively coupled to said cassette guide, and cooperable with said second cam portion, reciprocal movement of said loading plate between its first and second positions causing said second cam portion to reciprocally pivot said loading link so as to reciprocally move said cassette guide between its cassette ejecting and cassette inserted positions, respectively.

2. A mechanism of claim 1, further comprising:

a first switch operatively coupled to said motor and engageable with said loading link, said first switch being actuated and causing said motor to rotate in a forward direction effecting movement of said cassette guide from its ejecting position to its inserted position when the first switch is pushed by said loading link; and a second switch operatively coupled to said motor and actuated by said cassette holder upon completion of the movement of said guide arm to its second position, actuation of said second switch causing said motor to stop.

3. A mechanism of claim 1, further including a third cam portion formed on said loading plate and a pivotable lid link which is engageable with a lid of a cassette and is rotated by said third cam portion in response to movement of said loading plate.

4. A mechanism of claim 1 wherein said cassette tape player is of a front-loading type including a rotary cylinder head.

5. A mechanism of claim 1, including a claw supported on said cassette guide for pivotal movement relative to said cassette holder between first and second pivotal positions in which said claw is respectively engageable with and spaced from a cassette inserted in said cassette holder, and including means cooperable with said claw for effecting movement of said claw from its second pivotal position to its first pivotal position as said cassette guide moves from its cassette ejecting position to its cassette inserted position.

6. A mechanism of claim 1, including a guide link supported on a stationary member for pivotal movement about a pivot axis which is parallel to a pivot axis of said guide arm, said guide link being pivotally coupled to said cassette holder at a location spaced from said pivot axis of said guide link.

* * * * *